United States Patent Office 3,121,669
Patented Feb. 18, 1964

3,121,669
PROCESS FOR PREPARING POLY-β-HYDROXY-BUTYRIC ACID
James N. Baptist, Clarksville, Md., assignor to W. R. Grace & Co., New York, N.Y., a corporation of Connecticut
No Drawing. Filed Dec. 26, 1962, Ser. No. 247,362
7 Claims. (Cl. 195—47)

This invention relates to the growth of bacteria. In one particular aspect it is a method of regulating the pH of a bacterial culture medium during metabolism of acetate ion. In another particular aspect it is a method of introducing acetic acid into the bacterial culture medium. In still another particular aspect, it is a method for promoting bacterial synthesis of poly-β-hydroxybutyric acid, a polymer consisting of repeating units of the formula [—CH(CH$_3$)CH$_2$C(O)O—]$_n$.

This application is a continuation-in-part of my copending application S.N. 66,433, filed November 1, 1960, now abandoned.

In summary, the invention in its broadest aspect is directed to adding acetic acid vapor to the aerating stream of a culture medium of any bacteria known to produce poly-β-hydroxybutyric acid at about the same rate as acetic acid is metabolized so that the pH of the culture is maintained at an optimum value for bacterial growth viz., 7–9 and also for synthesis of poly-β-hydroxybutyric acid. All species which are known to synthesize the said polyester will produce improved yields of the polyester when treated with acetic acid vapor in the manner set forth herein.

Poly-β-hydroxybutyric acid can be synthesized by various bacteria under suitable conditions. The choice of bacteria depends not only on one capable of forming this polyester, but also on one which can effect the desired biochemical change within a relatively short time and can produce the highest yield with a minimum of attention.

The families where this polyester is known to occur include Athiorhodaceae, Pseudomonadaceae, Spirillaceae, Rhizobiaceae, Bacillaceae and Azotobacteriaceae, and any of these is suitable in the process of this invention.

This invention is concerned with the bacterial metabolism of acetate ion. The metabolism of a bacterial cell may be defined as all the chemical reactions involved in the life of the cell whereby food is transformed into cellular material or utilized as a source of energy in the performance of work. The metabolic activities of the cells are controlled to a great extent by enzymes. Enzymes are agents produced by the cell to catalyze specific reactions. Certain other agents, also produced by the cell and known as coenzymes, implement the action of the enzyme.

It is well known that acetate ion can be formed from glucose, pyruvic acid or other materials, but it is usually included in the medium in the form of sodium acetate. In this invention acetate ion is metabolized primarily from a continuous source of acetic acid vapor. A proposed overall mechanism of the bacterial synthesis of poly-β-hydroxybutyric acid is given below. In this process acetic acid reacts as a derivative of coenzyme A (CoA). The reduced forms of the coenzymes, diphosphopyridine nucleotide (DPNH), and triphosphopyridine nucleotide (TPNH), serve as hydrogen carriers.

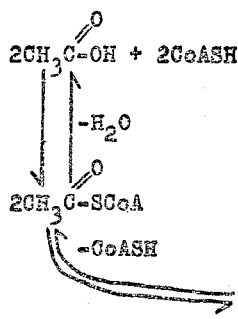
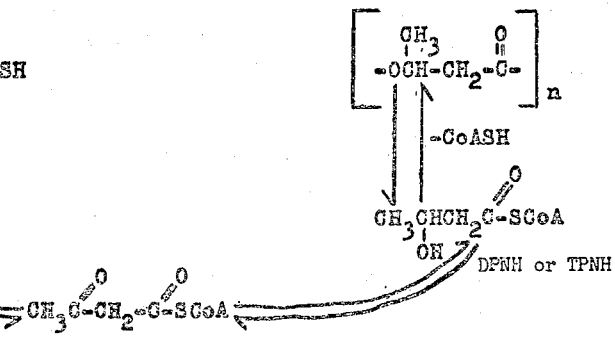
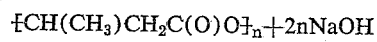

The pH of a culture medium exerts a decisive influence on whether an organism will be able to grow in a given medium. A pH of about 7 is optimum for most species of bacteria. Products of metabolic activity, however, may be acidic or basic thus shifting the pH beyond the limits necessary for bacterial survival. Phosphate buffers are usually included in the nutrient medium to prevent changes in pH. I have found, however, that the use of these buffers is not effective in controlling pH in bacterial synthesis of poly-β-hydroxybutyric acid and that additions of high concentrations of buffer result in relatively low product yields of this polyester. (See Examples I, III, and IV, below.)

Although the process of this invention is operable with any bacteria that form poly-β-hydroxybutyric acid, including bacteria of any of the families above specified, it is particularly suitable for the synthesis of poly-β-hydroxybutyric acid by *Rhodospirillum rubrum*. I found that when these bacteria were exposed to conditions favoring poly-β-hydroxybutyric acid synthesis, i.e., bubbling hydrogen through the culture medium at a pH of 7, sodium acetate in the medium was rapidly converted into the polyester. I have found, however, that polyester synthesis was hindered by the products of metabolic activity which caused the medium to become alkaline. The mechanism in simplified form is as follows:

$nH_2 + 2nCH_3CO_2Na \rightarrow$
$\quad [CH(CH_3)CH_2C(O)O]_n + 2nNaOH$

As has been mentioned, the addition of more phosphate buffers to the conventional acetate nutrient medium resulted in relatively low product yields. I discovered, however, that if acetic acid vapor was added to the aerating hydrogen stream to furnish acetic acid at a rate just equal to the rate at which acetate ion was metabolized, polyester synthesis occured at a maximum rate with very little change in pH. The rate of addition of acetic acid vapor to the aerating stream was adjusted from time to time to maintain a pH of 7–8.

It is evident that the use of a particular aerating gas largely depends on its effect on the synthesis of the polyester by a particular species of bacteria. Nitrogen, hydrogen, air, and carbon dioxide are some of the more commonly used aerating gases, and each is operable in the process of this invention.

Poly-β-hydroxybutyric acid can be recovered from the cells by several methods. The preferred method, and the one used throughout this invention, is described in detail in my copending application S.N. 58,154, filed September 26, 1960, now Patent 3,036,959. The bacteria are collected by known means, e.g., centrifugation, and the mass of wet cells is dried by suitable means, for example, by dispersing them in acetone. Upon removal of the acetone, the bacterial residue is easily dried to a powder. The powder is then treated with pyridine at reflux for 5–30 minutes to dissolve the poly-β-hydroxybutyric acid. The resulting polyester solution is filtered and ether is added to the filtrate to precipitate the polyester.

Poly-β-hydroxybutyric acid produced by this novel method is a translucent, plastic-like polyester which can be utilized in several ways. It is easily cast into a film or molded into articles by conventional methods. It is also useful for surface coatings and as a fiber.

It is especially useful in the field of medicine. Medical sutures made of poly-β-hydroxybutyric acid need not be removed since they eventually decompose to naturally occurring substances without harm to the patient. Films of poly-β-hydroxybutyric acid can be used to support injured arteries and blood vessels until the tissues heal.

*Example I (Control)*

In this experiment only phosphate buffer was used to attempt to control the pH of the culture medium for the synthesis of poly-β-hydroxybutyric acid by *Rhodospirillum rubrum*.

A nutrient medium having the following composition was prepared:

| | |
|---|---|
| Phosphate buffer [1] _____ ml__ | 320.0 |
| Mixed mineral solution [2] _____ ml__ | 320.0 |
| Sodium acetate _____ g__ | 22.0 |
| Yeast extract _____ g__ | 16.0 |
| Water _____ l__ | 15.4 |

[1] Phosphate buffer: 46.0 g. $KH_2PO_4$, 86.4 g. $Na_2HPO_4 \cdot 7H_2O$, 2000 ml. $H_2O$.
[2] Mixed mineral solution: 10 g. nitrilotriacetic acid dissolved in $H_2O$ and neutralized with a solution of 7.3 g. KOH (pH about 8). Add 14.45 g. of $MgSO_4$, 2.5 g. $CaCl_2$, 9.2 mg. $(NH_4)_6Mo_7O_{24} \cdot 4H_2O$, 99 mg. $FeSO_4 \cdot 7H_2O$, 5.0 ml. standard trace metal solution. (Standard trace metal solution: 0.106 g. $CoCO_3$, 1.14 g. $MnCO_3$, 5.21 g. $ZnCl_2$, 5.0 g. $FeSO_4 \cdot 7H_2O$, 0.39 g. $CuSO_4 \cdot 5H_2O$, 0.117 g. $H_3BO_3$, 2.50 g. versene acid, several drops $H_2SO_4$, 1000.0 ml. $H_2O$.) Add $H_2O$ to give 1 l. final volume and adjust to pH 6.5–7.0.

The nutrient medium was autoclaved and allowed to cool. An 80 ml. inoculum of *R. rubrum* (C. B. van Niel strain 1.1.1.) from a seven day old culture was added to the nutrient medium. Two 150-watt floodlights were focused on the culture and the temperature was maintained at about 30° C. The medium was continuously aerated with a stream composed of 5% $N_2$ and 95% $CO_2$, at a flow rate of about 100 cc./min.

After six days the stream of $N_2$ and $CO_2$ was stopped and the culture was aerated with $H_2$ at a rate of about 200 cc./min. At the end of six hours the pH had risen from 7 to 9 and the $H_2$ was stopped. The cells were harvested by centrifugation and 2.05 g. of polyester were recovered.

*Example II*

In this experiment the process of this invention was utilized. The procedure of Example I was followed except that the hydrogen was first bubbled through a column (4 cm. I.D. x 15 cm. high) of glacial acetic acid maintained at room temperature before it was used to aerate the culture medium. The rate of addition of acetic acid vapor was controlled so that it was added at about the same rate as the acetate ion was metabolized.

The rate of addition of acetic acid (while keeping the hydrogen flow constant) can be adjusted by the usual laboratory techniques. If the medium becomes acidic, the flow rate of hydrogen gas through the acetic acid column can be cut down and additional hydrogen can be added directly to the medium through a second hydrogen inlet. As an alternative method, the temperature of the acetic acid and of the hydrogen gas stream can be lowered since at a lower temperature the vapor pressure of acetic acid is lower.

The pH of the medium was tested periodically to determine rate of addition of acetic acid vapor. Since the pH rose very slowly from 7 to almost 8, aeration with hydrogen was continued for about 24 hours. The hydrogen was then stopped and the cells were harvested by centrifugation. 3.8 g. of poly-β-hydroxybutyric acid were recovered from 55.6 g. of wet packed cells.

*Example III (Control)*

The procedure of Example I was followed except that in this experiment an unusually large amount of phosphate buffer, 69 g. $K_2HPO_4$, 95 g. $KH_2PO_4$ and 129.6 g. $Na_2HPO_4 \cdot 7H_2O$, was added to the nutrient medium (in addition to the phosphate buffer used in Example I). In this case $H_2$ was bubbled directly through the medium for about 24 hours. Although the pH of the medium remained close to 7, the yield of wet packed cells was 46.9 g. containing only 2.02 g. of poly-β-hydroxybutyric acid.

*Example IV (Control)*

In this experiment, only phosphate buffer was used in an attempt to control the pH of the culture medium for the synthesis of poly-β-hydroxybutyric acid by *Bacillus megaterium*.

A nutrient medium with the following composition was prepared:

| | Grams |
|---|---|
| $NH_4NO_3$ | 10.0 |
| $KH_2PO_4$ | 20.0 |
| $Na_2HPO_4 \cdot 7H_2O$ | 37.0 |
| $MgSO_4$ | 4.0 |
| $CaCl_2$ | 0.4 |
| $FeCl_3$ | 0.2 |
| Glucose | 400 |
| $Na^+ CH_3CO_2^-$ | 20 |
| Yeast extract | 20 |

$H_2O$, 10 l.
pH=7.0.

All of the glucose and half of the water were autoclaved separately in order to prevent oxidation of glucose. After each solution had been autoclaved, they were mixed and divided into two 5 liter portions. The first portion was used in this experiment while the second portion was used for a parallel experiment described in the following example.

Five liters of nutrient medium was placed in one fermentor of a New Brunswick Scientific Co. Fermentor assembly, FS-307. The inoculum was 200 ml. of a *B. megaterium* culture. Aeration was at ½ liter per min. of filtered air. The stirring rate was 400 r.p.m., the air pressure was 10 p.s.i., and the water bath was set at 25° C.

After 4 days, a dense cell population was present. On the fifth day, a 100 ml. aliquot sample was removed for examination. The pH was 9 and 0.15 g. of poly-β-hydroxybutyric acid were recovered. After seven days, the pH was about 10 and 0.20 g. of polyester was present in 100 ml. of culture. The phosphate buffer present in this solution is obviously not able to control the pH and the high pH hinders polyester synthesis.

*Example V*

This experiment was the same as Example IV except that a stream of $N_2$ gas containing acetic vapor was also bubbled through the system. The nitrogen was first bubbled rapidly through a column of glacial acetic acid and then through the culture by means of an inlet tube separate from the air inlet. This nitrogen addition was started on the fourth day. On the fifth day, this culture had a pH of 7.5 and a polyester yield of 0.25 g. per 100 ml. The rate of acetic acid addition was increased by warming the column of acetic acid to 35° C. On the sixth day, the culture was still at pH=7.5 and the polyester yield was 0.33 g./100 ml. After seven days, the pH was 7.6 and the polyester yield was 0.42 g./100 ml. This result shows clearly that continuous addition of acetic acid by the method of this invention is able to control the pH and increase the polymer yield by over 100%.

I claim:

1. In the process of preparing poly-β-hydroxybutyric acid by the growth of bacteria selected from the group consisting of Athiorhodaceae, Pseudomonadaceae, Spirillaceae, Rhizobiaceae, Bacillaceae and Azotobacteriaceae in a culture medium whereby the bacteria acquire deposits of said polyester within the cell walls followed by recovery of the polyester-containing bacteria, the improvement which comprises entraining acetic acid vapor in a gas stream, continuously aerating the culture medium with said gas, and, throughout the growth period, maintaining the amount of acetic acid supplied to the medium by adjusting the amount of acetic acid entrained in said gas stream to maintain the culture medium pH at 7–9.

2. The process according to claim 1 in which the bacterium is *Rhodospirillum rubrum*.

3. The process according to claim 1 in which the bacterium is *Bacillus megaterium*.

4. The process according to claim 1 in which the aerating gas is hydrogen.

5. The process according to claim 1 in which the aerating gas is nitrogen.

6. The process according to claim 1 in which the aerating gas is air.

7. The process according to claim 1 in which the aerating gas is carbon dioxide.

References Cited in the file of this patent

UNITED STATES PATENTS 2,803,586    Peterson et al. _____ Aug. 20, 1957

OTHER REFERENCES

Journal of General Microbiology, 1958, col. 19, QR1J4; pp. 210–222.